(12) United States Patent
Kadgi et al.

(10) Patent No.: US 11,093,020 B2
(45) Date of Patent: Aug. 17, 2021

(54) FLEXIBLE MULTIPORT USB TYPE-C POWER MANAGEMENT

(71) Applicant: Intel Corporation, Santa Clara, CA (US)

(72) Inventors: Vijaykumar B. Kadgi, Portland, OR (US); Barnes Cooper, Aloha, OR (US); Nivedita Aggarwal, Portland, OR (US); Venkataramani Gopalakrishnan, Folsom, CA (US); Jenn Chuan Cheng, Bayan Lepas FTZ (MY); Basavaraj Astekar, Hillsboro, OR (US); Charuhasini Sunderraman, Bangalore (IN); Han Kung Chua, Bayan Lepas (MY); Anil Baby, Bangalore (IN); Tin-Cheung Kung, Folsom, CA (US); Chia-Hung Kuo, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 15/819,552

(22) Filed: Nov. 21, 2017

(65) Prior Publication Data
US 2019/0033953 A1 Jan. 31, 2019

Related U.S. Application Data

(60) Provisional application No. 62/568,131, filed on Oct. 4, 2017.

(51) Int. Cl.
*G06F 1/32* (2019.01)
*G06F 1/3287* (2019.01)
*G06F 1/3296* (2019.01)
*G06F 13/42* (2006.01)
*G06F 13/38* (2006.01)
*G06F 1/26* (2006.01)

(52) U.S. Cl.
CPC ............ *G06F 1/3287* (2013.01); *G06F 1/266* (2013.01); *G06F 1/3296* (2013.01); *G06F 13/385* (2013.01); *G06F 13/4282* (2013.01); *G06F 2213/0042* (2013.01)

(58) Field of Classification Search
CPC .............................. G06F 1/266; G06F 1/3296
See application file for complete search history.

(56) References Cited

U.S. PATENT DOCUMENTS

| | | | |
|---|---|---|---|
| 2013/0154551 A1* | 6/2013 | Jeansonne | G06F 1/266 320/107 |
| 2015/0067359 A1* | 3/2015 | Morita | G06F 1/266 713/300 |
| 2015/0362984 A1* | 12/2015 | Waters | G06F 1/3215 713/324 |

* cited by examiner

*Primary Examiner* — Albert Wang
(74) *Attorney, Agent, or Firm* — Schwegman Lundberg & Woessner, P.A.

(57) ABSTRACT

Techniques are provided for managing power delivery to multiple universal serial bus (USB) type-C ports of a desktop computer system. In an example, a method can include providing a first power level to a USB power delivery controller during a non-sleep mode operation of the desktop computer, and providing a second power level to the USB power delivery controller when the computer is in a sleep mode, the second power level configured to provide default charge power to a connected device when the computer is in the sleep mode.

20 Claims, 9 Drawing Sheets

FLEXIBLE MULTIPORT USB TYPE-C POWER MANAGEMENT

PRIORITY AND RELATED APPLICATIONS

This patent application claims the benefit of priority of Charuhasini S, U.S. Provisional Patent Application Ser. No. 62/568,131, entitled "FLEXIBLE MULTIPORT USB TYPE-C POWER MANAGEMENT," filed on Oct. 4, 2017, which is hereby incorporated by reference herein in its entirety.

TECHNICAL FIELD

This document pertains generally, but not by way of limitation, to desktop computer systems, and more particularly to providing power to USB type-C ports in desktop computer systems.

BACKGROUND

USB Type-C has gained in popularity and usage of multiple ports per unit system is increasing. Power hungry devices like Laptop/Ultrabook, Tablet, Virtual Reality and etc. are consuming power using 20V at 5 A thru USB Type-C connectors. Desktop systems are transforming to support multiple USB Type-C ports and supply higher power to attached devices that can handle the higher power. However, conventional desktop computer systems provide limited options for managing power to multiple Type-C ports.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
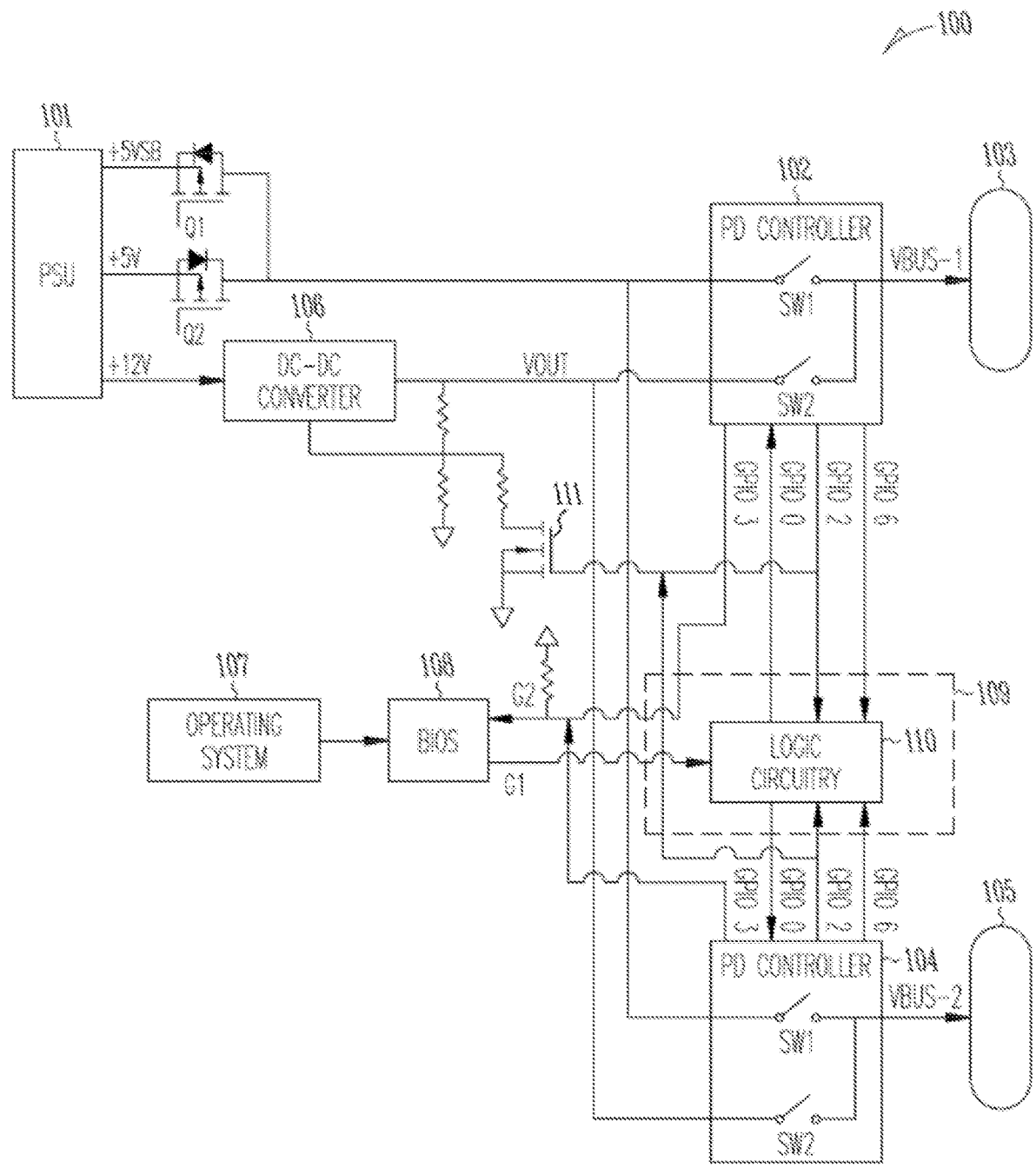
FIG. 1 illustrates generally an example desktop computer system configured to provide flexible power management of multiple USB type-C ports.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Universal serial bus (USB) Type-C has gained in popularity and usage of multiple ports is increasing in the industry. Power hungry devices like Laptop/Ultrabook, Tablet, Virtual Reality and etc. can consume power using for example, up to 20V at 5 A thru a USB Type-C connector. Desktop system are in the process of transforming to support multiple USB Type-C ports and multiple USB Type-C ports with higher power to facilitate attached devices that may require it. With limited input power, desktop platforms need to manage power smartly. Examples discussed below provide a flexible way to manage the power for multiple Type-C ports.

Conventional desktop systems support a single USB type-C port. Convention power support can take the form of one lower power profile (mostly 5V@3 A/15 W) and there is no power management for effective utilization of power. The USB Type-C VBUS can be supplied by a to 5 volt (V) sources, +5V stand by (+5 VSB) and +5V from the desktop power supply, sometimes referred to as an ATX PSU, and can be controlled by a power control switch. The power control switch can be inside the USB Type-C controller or on the platform controlled by system embedded controller or provided by a driver. Power can be provided to the port when the system is active. When the system goes to idle state or a sleep state, USB device charging is generally not supported and the supply voltage to the USB type-C port can be turned off (e.g., VBUS=0 Volts). Without a power management solution as discussed below, conventional desktop system are limited to 15 W, can not supply USB VBUS power when the system is in sleep or off state, and can only provide a single USB type-C port.

In certain examples, the present subject matter allow desktop computers to support more ports such as multiple USB type-C interfaces. However, since conventional desktop power is limited, certain examples also provide techniques to dynamically adjust power delivery to the ports based on, for example, the input power source, number of attached devices, and the type of attached device. Types of attached devices can include, but are not limited to, virtual reality, TBT device, unpowered dock, etc. In certain examples, an example circuit can provide active power management of multiple ports such as multiple USB type-C ports. Logic within the circuit can interface with and route I/O connections between the system BIOS and the power delivery (PD) controllers, fine tune a DC-DC converter to provide proper voltage and current based on a negotiated PD contract, and manage multiple USB power supply busses (VBUS) when multiple devices are connected.

In certain examples, the techniques described can provide, or assist in providing, ability to connect a device to any port of a desktop system, support for multiple ports and multiple connected devices, higher power profiles while conserving energy, charging devices that are in an idle state while meeting conventional desktop power supply specifications, reducing embedded controller and driver base software overhead, use of existing I/O of PD controllers resulting in low cost of added functionality, and do so using a simple yet elegant implementation.

FIG. 1 illustrates generally an example desktop computer system 100 configured to provide flexible power management of multiple USB type-C ports. The system 100 can include a desktop power supply unit 101, a first PD controller 102 coupled to a first USB type-C port 103, a second PD controller 104 coupled to a second USB type-C port 105, a DC-DC converter 106, control components 107, 108 of a desktop computer 100, and an example power management circuit 109. The desktop power supply 101 can provide standby power (5 VSB) and multiple operating voltages (e.g., +5V, +12V). The DC-DC converter 106 can receive one of the multiple operating voltages of the desktop power supply 101 and can provide a variety of selectable output voltages (e.g., 5 volts, 9 volts, 15 volts, 20 volts, etc.) to the first and second PD controllers 102, 104. The control components 107, 108 of the desktop computer can include, but are not limited to, the operating system 107 and the basic input/output system (BIOS) 108. The control components 107, 108 can provide indications of the computer system state and, in some cases, indications of upcoming computer system 100 state changes.

Each of the PD controllers 102, 104 can include one or more switches (SW1, SW2) to route power from the desktop power supply 101 to the power supply bus (VBUS) of the corresponding USB type-C port 103, 105. In addition, the PD controllers 102, 104 can negotiate with a connected device (not shown), such as a port partner, to provide power at an expected voltage and maximum current. As illustrated, each PD controller 102, 104 can include a number of I/O to assist the power management circuit 109 in managing power to the one or more PD controllers 102, 104 as well as allowing for coordinated power with a port partner during state changes of the desktop computer system 100.

Figure 2:
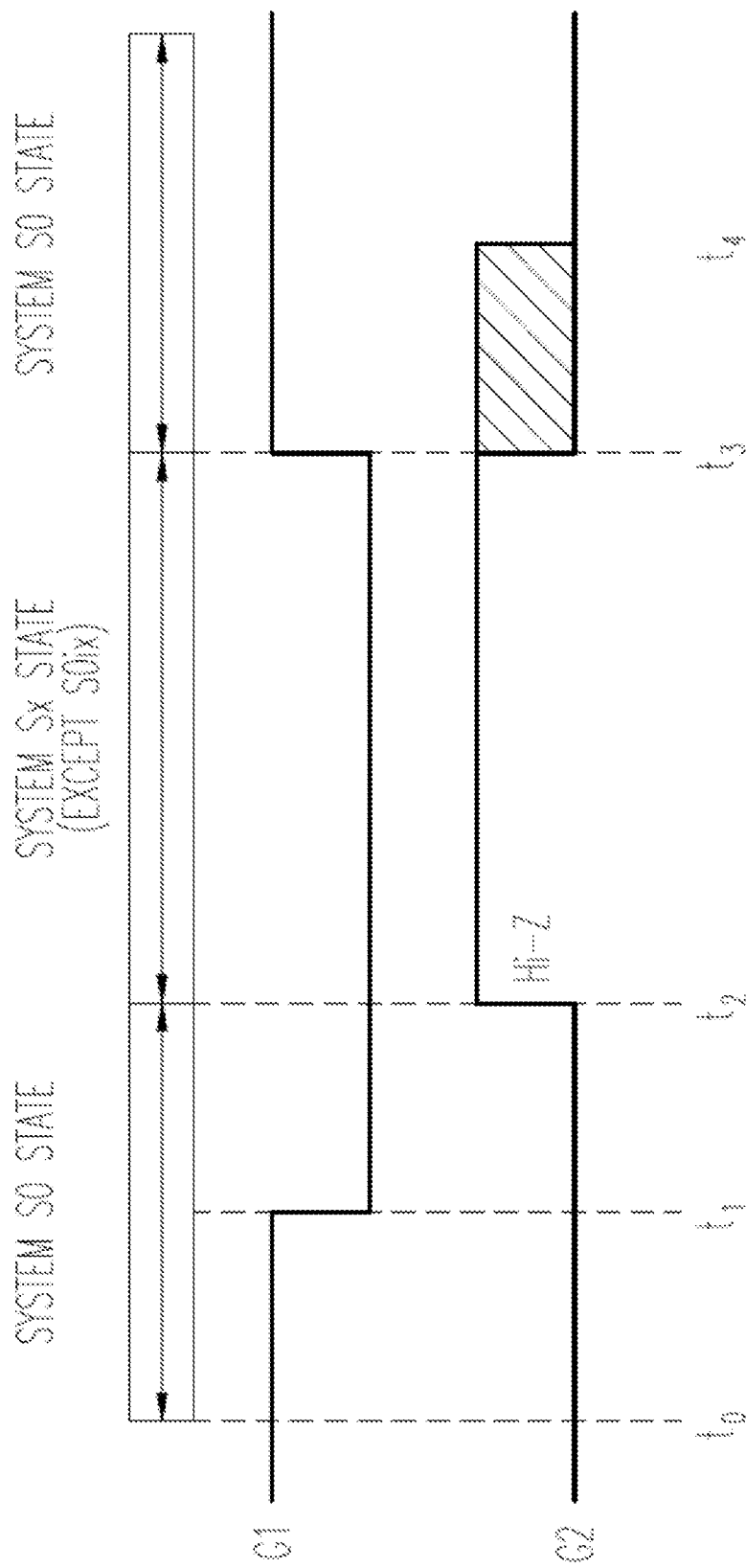
FIG. 2 illustrates generally a timing diagram of an example method of operating a power management circuit during state changes of a desktop system.

FIG. 2 illustrates generally a timing diagram of an example method of operating a power management circuit during state changes of a desktop system. The example method assists, via the power management circuit, in coordinating power delivery of each PD controller before, during, and after the state changes. At $t_0$, the desktop system can be in an active state, sometimes referred as an S0 state. The bios of the system can maintain a first BIOS output (G1), or power management circuit input, in a first state to indicate operation of the desktop system in the S0 state. During operation in the S0 state, a BIOS input (G2) can be maintained in a non-default state by one or more PD controllers. The non-default state can indicate to the BIOS that one or more PD controllers is not at a lowest power delivery contract. In certain examples, a lowest power delivery contract can be 5V at a default current such as 900 mAmps, for example, over the power supply bus (VBUS) of the USB type-C ports.

At $t_1$, the desktop system BIOS can place the first BIOS output (G1) in a second state to indicate a subsequent change of the system from an active state to a sleep or idle state. Such states are sometimes referred to as Sx, S3, S4, S5, DS3, DS4, or DS5. The second state of the first BIOS output can be received by a logic circuit of the power management circuit. The logic circuit can relay the second state of the first BIOS output to the PD controllers to initiate the PD controllers to negotiate the lowest power delivery contract. At $t_2$, a commonly coupled output (FIG. 1, GPIO3) of all the PD controllers, and a BIOS input (G2) can be released to a default state indicating that each PD controller has negotiated the lowest power delivery contract with a respective port partner or there is no connected device to the PD controller. In certain examples, the power management circuit can directly route the output (FIG. 1, GPIO3) of each PD controller directly to the BIOS input (G2). In response to the default state of the BIOS input, the desktop system can enter the sleep or idle mode. In certain examples, the method illustrated in FIG. 2 allows the connection between each PD controller to be maintained at a lower power level that, compared to conventional desktop systems, would unexpectedly terminate providing power to a port partner. Using the example method, a level of connection can be maintained between the PD controller and the port partner such that upon exiting the sleep or idle mode, the PD controller only renegotiates a power delivery contract and does not need to re-establish a full connection which can include a substantial amount of time and resources, such as for example to first identify the port partner and negotiate one or more protocols or settings including negotiating a power delivery contract.

At $t_3$, the desktop system can exit the sleep or idle mode and the BIOS can place the BIOS output (G1) to the first state. The first state of the BIOS output can be received by the logic circuit of the power management circuit. The logic circuit can relay the first state of the first BIOS output to the PD controllers to allow the PD controllers to negotiate, if necessary, a higher power delivery contract with the corresponding port partner or connected device. At $t_4$, at least one PD controller can indicate a higher power level power delivery contract by placing a PD controller output, and the BIOS input to a non-default state.

Referring again to FIG. 1, each PD controller 102, 104 can provide additional information to the logic circuit 110 of the power management circuit 109 to further assist in providing coordinated power management of the multiple PD controllers 102, 104. A second PD controller output (GPIO2) and a third PD controller output (GPIO6) can provide an indication to the logic circuit 110 of a particular power delivery contract. For example, the third PD controller output (GPIO6) can provide an indication of whether the power delivery profile is providing 5V at a default current or 5V at 3 A. In addition to indicating a particular power delivery contract, the second PD controller output (GPIO2) can also control a switch 111 in a feedback path to the DC-DC converter 106. The switch 111 can change a characteristic of the feedback path such that the output of the DC-DC converter 106 provides a first voltage when the switch 111 is enabled or a second voltage when the switch 111 is disable. In some examples, the power management circuit 109 can include at least a portion of the feedback path.

In certain examples, the power management circuit 109, utilizing the I/O of the PD controllers 102, 104 can ensure that when one port is in a higher power profile, other ports are defaulting to a power profile that limits the overall power delivery within the capabilities of the desktop power supply 101. Table 1 illustrates an example of power profile combinations for a desktop computer system with two USB PD controllers, two USB type-C ports, and an example power management circuit 109 that can allow the system to support power delivery during system S0 (system active state) and Sx (Sleep/hibernate/shutdown) while meeting CEC (California Energy Commission) power saving requirements.

TABLE 1

| Desktop State | PD Controller 1 Output | PD Controller 2 Output |
|---|---|---|
| Sx | 5VDC @ default current | 5VDC @ default current |
| S0 | 5VDC @ default current | 5VDC @ default current |
|  | 5VDC @ 3A | 5VDC @ 3A |
|  | 5VDC @ default current | 5/9/15/20VDC @ 5A |
|  | 5/9/15/20VDC @ 5A | 5VDC @ default current |

Tables 2A and 2B illustrate generally example indications that can be assigned to the I/O of the system of FIG. 1.

TABLE 2A

BIOS I/O

| Name | Input or Output | Function |
|---|---|---|
| G1 | BIOS Output | 0: System is ready to enter Sx state |
|  |  | 1. System is not in Sx state |
| G2 | BIOS Input | 0: a PD controller not in lowest power delivery contract |
|  |  | 1: all PD controllers in lowest power delivery contract |

TABLE 2B

PD controller I/O

| Name | Input or Output | Function |
|---|---|---|
| GPIO0 | Input | 0: request lowest PD contract |
|  |  | 1: no particular PD contract request |
| GPIO2 | Output | 0: PD controller has not accepted PD contract or port has no connection. |
|  |  | 1. PD controller has accepted a high power PD contract |
| GPIO3 | Output | 0: PD controller not in default (lowest) PD contract. |
|  |  | 1: PD controller in default (lowest) PD contract |
| GPIO6 | Output | Negotiated PD contract = 5VDC @ default current |
|  |  | Negotiated PD contract = 5VDC @ 3A |

Figure 9:
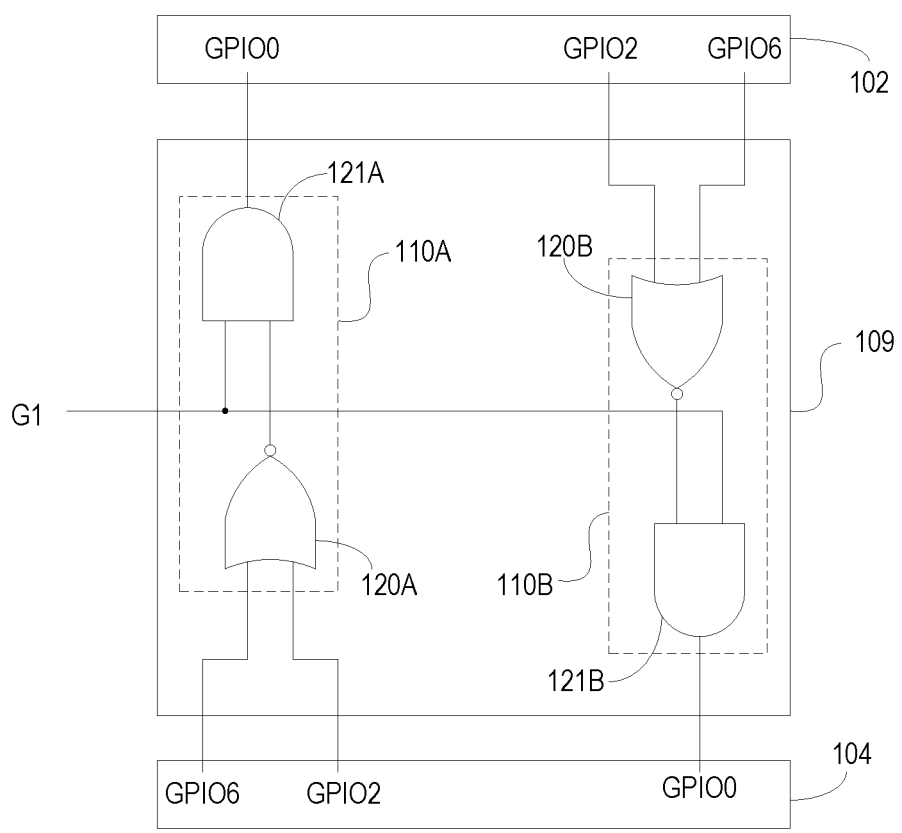
FIG. 9 illustrates generally an example power management circuit.

FIG. 9 illustrates generally an example power management circuit 109. The power management circuit can include one or more logic circuits 110A, 110B. In certain examples, each logic circuit 110A, 110B can include a NOR-gate 120A, 120B and an AND gate 121A, 121B. The NOR-Gate 120A of a first logic circuit 110A can receive inputs (GPIO2, GPIO6) from the second PD controller 104 and can provide an output to the AND-gate 121A. The AND-gate 121A of the first logic circuit 110A can receive the output of the NOR-gate 120A and an output (G1) of the desktop computer, and can provide an output to an input (GPIO0) of the first PD controller 102. The NOR-Gate 120B of a second logic circuit 110B can receive inputs (GPIO2, GPIO6) from the First PD controller 102 and can provide an output to the AND-gate 121B. The AND-gate 121B of the second logic circuit 110B can receive the output of the NOR-gate 120B and the output (G1) of the desktop computer, and can provide an output to an input (GPIO0) of the second PD controller 104.

Figure 3:
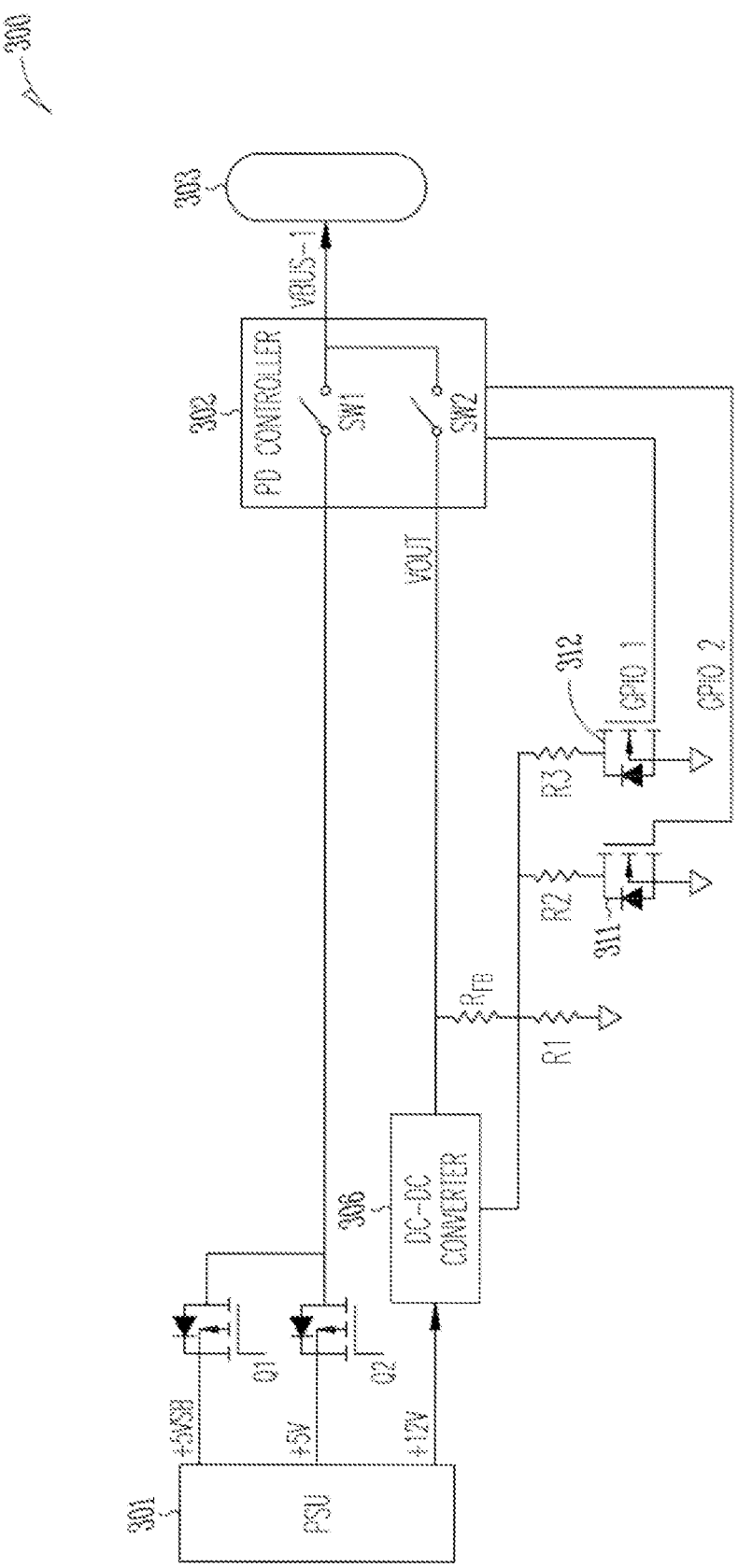
FIG. 3 illustrates an example of power profile combinations (FP1, FP2) for a desktop computer system with two USB type-C ports and an example power management circuit that can allow the system to support power delivery during system S0 (system active state) and Sx (Sleep/hibernate/shutdown) while meeting CEC (California Energy commission) power saving requirements.

FIG. 3 illustrates generally a desktop computer system 300 with a single USB type-C port 303 and an example PD controller 302. I/O of the example PD controller 302 can be used to select different power profiles by controlling switches 311, 312 in a feedback path of a dc-dc regulator 306. In an example, the desktop system 300 can include a power supply 301 (e.g., an ATX power supply), a USB power delivery controller 302 coupled to a USB type-C port 303, a dc-dc converter 306, and a feedback path of the dc-dc converter 306. The desktop power supply 301 can provide 5 volts DC (VDC) and 12 VDC. In certain examples, the desktop power supply 301 can provide two 5 VDC outputs. One 5 VDC output can provide an operating 5 VDC at 3 Amps (A) (+5V) and a second output can provide a standby 5 VDC (5 VSB). The desktop computer system 300 can control switches Q1, Q2 to control which of the two 5 VDC outputs is connected to the USB power delivery controller 302.

The USB power deliver controller 302 can identify, monitor and negotiate power delivery options for devices connected to the USB type-C port 303. In certain examples, the USB power delivery controller 302 can include at least two switches (SW1, SW2) to couple a supply voltage to the USB supply bus (VBUS). In certain examples, the USB power delivery controller 302 can include outputs (GPIO1, GPIO2) to manage voltages of some power delivery contracts. Such power contracts typically have voltages other than 5 volts and can include, but are not limited to, 9 VDC, 15 VDC, 20 VDC, etc. To provide such voltages, the USB power delivery controller 302 can work in cooperation with a DC-DC converter 306 coupled to an output of the desktop power supply 301. To change or select a voltage output of the DC-DC converter 306, the power delivery controller 302 can selectively alter a feedback voltage divider of the feedback path to the DC-DC converter 306. In the illustrated example, the feedback path can include first and second resistors ($R_{fb}$, R1) providing a default voltage divider. The outputs (GPIO1, GPIO2) of the power delivery controller can selectively couple additional resistors (R2, R3), via transistors 311, 312 for example, into the voltage divider to change the voltage level of the output of the DC-DC converter 306. In certain examples, the 12 VDC output of the desktop computer power supply 301 can provide higher power compared to the other outputs (5 VSB, +5V) of the desktop power supply 301.

In certain examples, the feedback resistors ($R_{fb}$, R1, R2, R3) can be configured to provide the output voltage indicated in Table 3 for the given state of the outputs (GPIO1, GPIO2) of the PD controller 302.

TABLE 3

| Output Voltage (Vout) | GPIO1 | GPIO2 |
|---|---|---|
| 5 V | 0 | 0 |
| 9 V | 0 | 1 |
| 15 V | 1 | 0 |
| 20 V | 1 | 1 |

Figure 4:
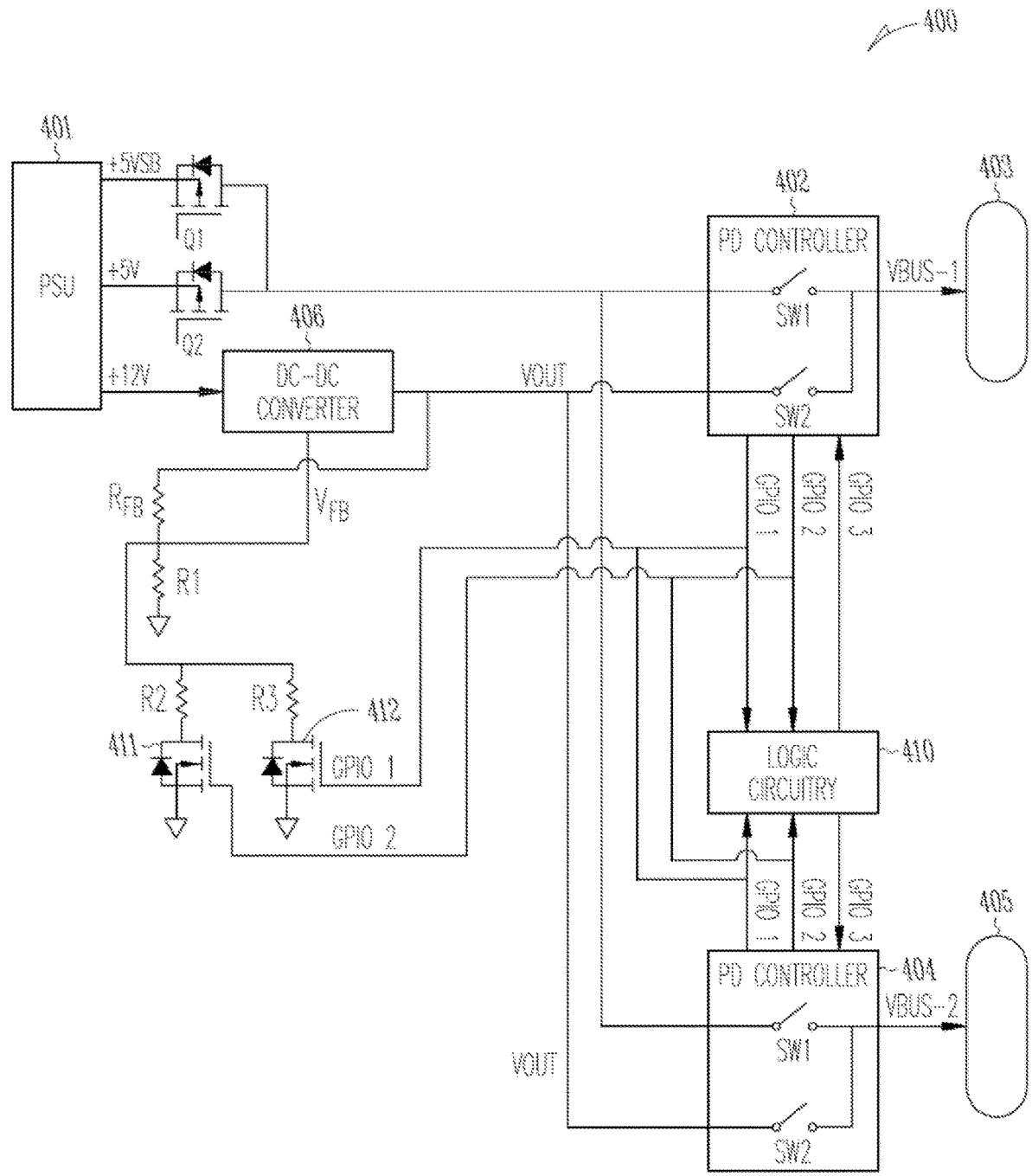
FIG. 4 illustrates generally a desktop computer system with multiple USB type-C ports and respective example PD controllers.

FIG. 4 illustrates generally a desktop computer system 400 with multiple USB type-C ports 403, 405 and respective example PD controllers 402, 404. The system 400 can include a desktop power supply unit 401, a first PD controller 402 coupled to a first USB type-C port 403, a second PD controller 04 coupled to a second USB type-C port 405, a DC-DC converter 406, control and an example power management logic circuit 410. As discussed above with reference to FIG. 3, I/O of the example PD controllers 402, 404 can be used to select different power profiles by controlling switches 411, 412 in a feedback path of a dc-dc converter 406. In certain examples, the power management circuit logic circuit 410, utilizing the I/O of the PD controllers 402, 404 can ensure that when one port is in a higher power profile, other ports are defaulting to a power profile that limits the overall power delivery within the capabilities of the desktop power supply 401.

Figure 5:
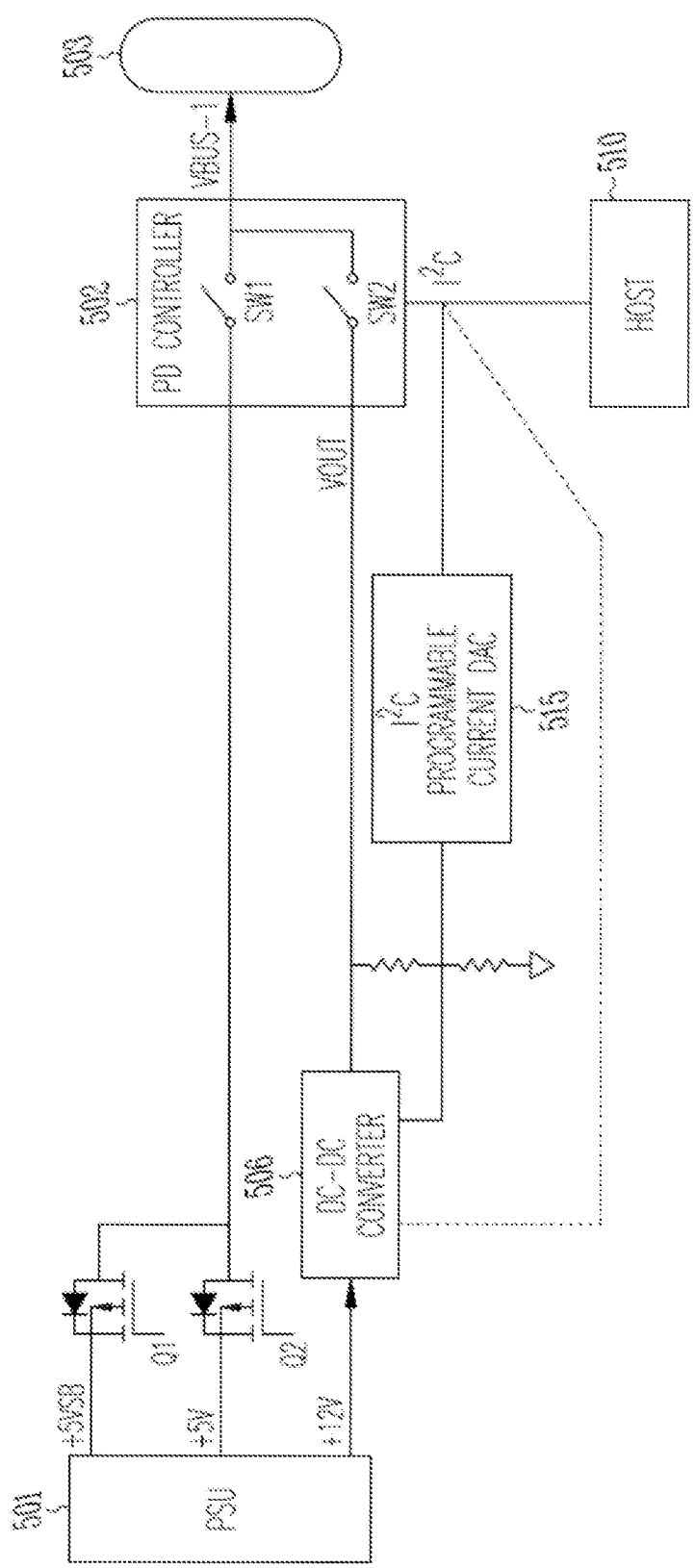
FIG. 5 illustrates generally a desktop computer system with a single USB type-C port and an example PD controller.
Figure 6:
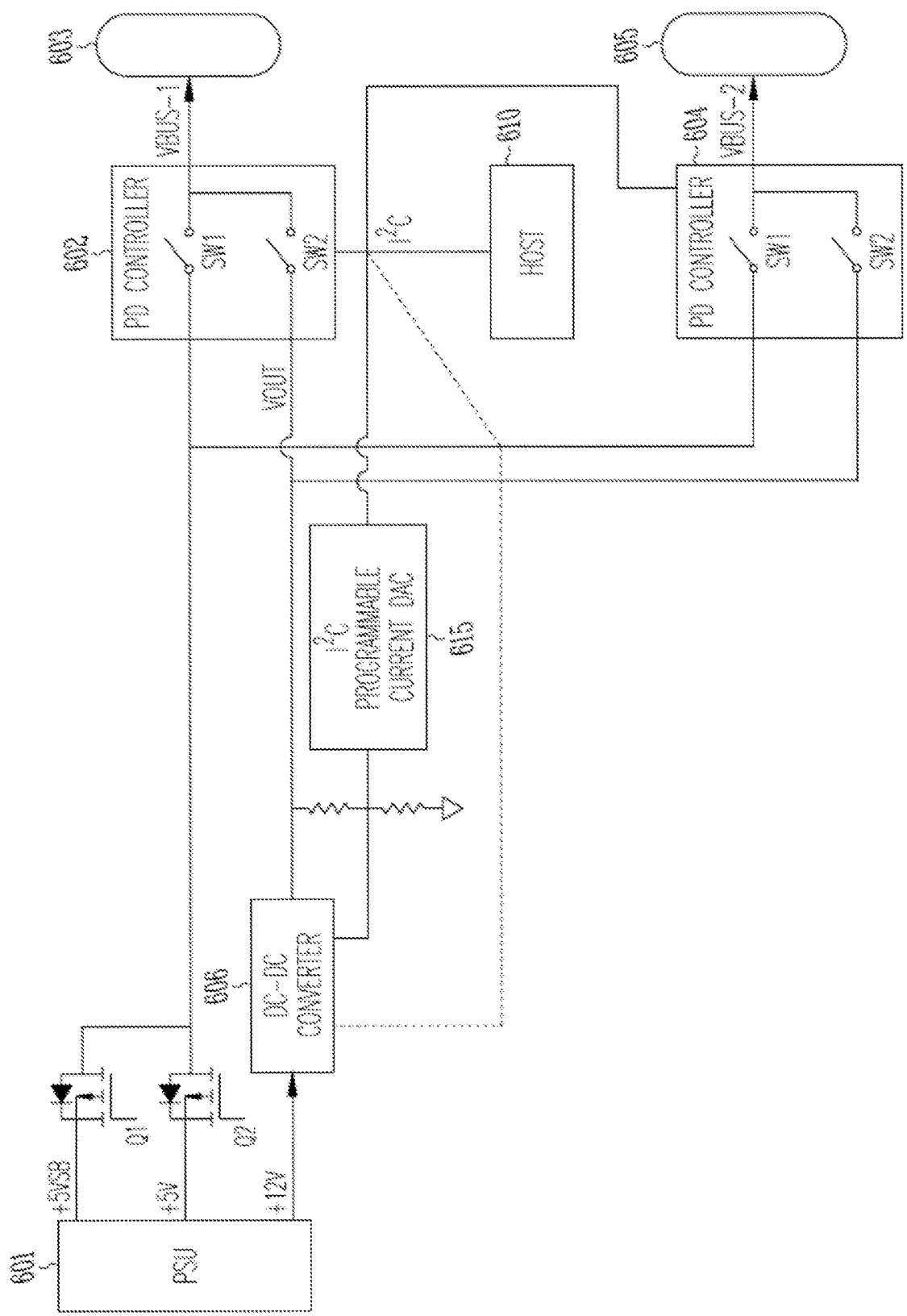
FIGS. 6 and 7 illustrate generally a single USB type-C port system and a multiple USB type-C system using example PD controllers having a serial communication protocol and a small processor to provide power management of the USB type-C ports.

FIGS. 5 and 6 illustrate generally examples of a single USB type-C port system 500 and a multiple USB type-C port system 600, respectively, using PD controllers 502, 602, 604 having a serial communication protocol and a host 510, 610 which can be to provide power management of the USB type-C ports 503, 603, 605. In certain examples, the systems 500, 600 can include a desktop power supply unit 501, 601, a first PD controller 502, 602 coupled to a first USB type-C port 503, 603, with regards to FIG. 6, a second PD controller 604 coupled to a second USB type-C port 605, a DC-DC converter 506, 606, and an power management controller 510, 610. The desktop power supply 501, 601 can provide standby power (SVSB) and multiple operating voltages (+5V, +12V). The DC-DC converter 506, 606 can receive one of the multiple operating voltages of the desktop power supply 501, 601 and can provide a variety of selectable output voltages (e.g., 5 volts, 9 volts, 15 volts, 20 volts, etc.) to the first and second PD controllers 502, 602, 604.

Each of the PD controllers 502, 602, 603 can include one or more switches (SW1, SW2) to route power from the desktop power supply 501, 601 to the power supply bus (VBUS) of the corresponding USB type-C port 503, 603, 605. In addition, the PD controllers 502, 602, 604 can negotiate with a connected device (not shown), a port partner, to provide power at an expected voltage and maximum current. Each PD controller 502, 602, 604 can include a number of I/O to assist the host 510 in managing power to the one or more USB type-C ports 503, 603, 605 as well as allowing for coordinated power with a port partner during state changes of the desktop computer system 500, 600. The I/O of the PD controllers 502, 602, 604, or other power delivery information can be communicated using a communication bus such as a serial communication bus including, but not limited to, an Inter-Integrated Circuit ($I^2C$) bus. In certain examples, each PD controller 502, 602, 604 can occupy a node of the communication bus as can a programmable digital-to-analog converter 515, 615 for providing a feedback voltage to the DC-DC converter 506, 606. Optionally, the DC-DC controller 606 can occupy a node of the communication bus such that the PD controller 502, 602, 604, or host 510, 610, can provide a voltage set point for the output (Vout) of the DC-DC converter 506, 606.

In certain examples, the host 510, utilizing the communication bus, can ensure that when one port is in a higher power profile, other ports are defaulting to a power profile that limits the overall power delivery within the capabilities of the desktop power supply. Table 1 illustrates an example of power profile combinations (FP1, FP2) for a desktop computer system with two USB type-C ports and an example power management circuit that can allow the system to support power delivery during system S0 (system active state) and Sx (Sleep/hibernate/shutdown) while meeting CEC (California Energy Commission) power saving requirements.

Figure 7:
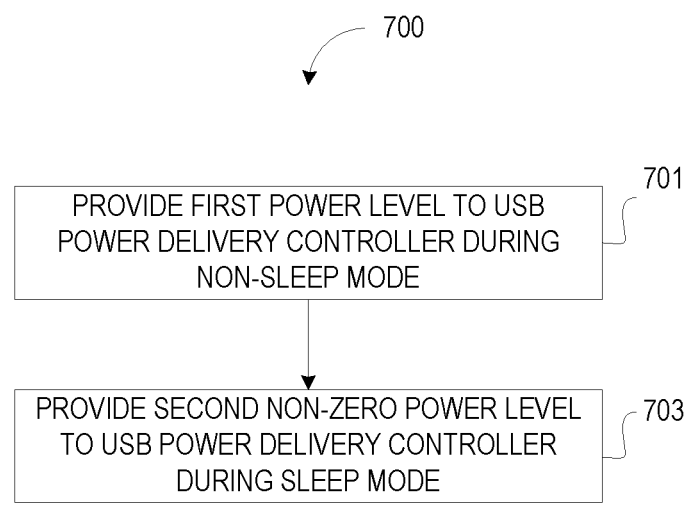

FIG. 7 illustrates generally a flowchart of an example method of using a logic circuit to manage power delivery of multiple USB type-C ports on a desktop computer. At 701, a first power level can be provided to a USB power delivery controller during a non-sleep mode operation of the desktop computer. In certain examples, providing the first power level can include changing or scaling a characteristic of a feedback path of a DC-DC converter that includes an output selectively coupled to the USB power delivery controller. In certain examples, the scaling can include using transistors to modify the resistance of a feedback voltage divider providing a representation of the output voltage of the DC-DC converter. At 703, a second, non-zero, power level can be provided to the USB power delivery controller when the desktop computer is in a sleep mode. In certain examples, the second power level can provide default charge power to a connected device when the desktop computer is in the sleep mode. In general, the first power level provided during full operating modes, or non-sleep modes, is higher than the second power level provided during the sleep mode.

In some examples, a BIOS of the desktop computer can provided sleep information including an indication that the desktop computer is planning to enter a sleep mode. The sleep information can be received at a power management logic circuit or controller and can be passed to one or more PD controllers, for example, as a sleep request indicator. In response to the sleep request indicator, the PD controllers can negotiate a lowest power delivery contract with a connected device and can provide a compliance output once the lowest power contract is enabled. The compliance output of the PD controllers can be coupled to or communicated to the BIOS. In response to receiving the compliance information from the PD controllers, the desktop computer can enter a sleep mode. Compared to conventional systems, negotiating the lowest power level with a connected device can retain a link with the connected device that would otherwise be suddenly terminated, without warning, when the desktop computer entered sleep mode. Retaining some form of link with the connected device can allow for quicker functionality of the connected device with the desktop computer after the desktop computer exits the sleep mode.

Figure 8:
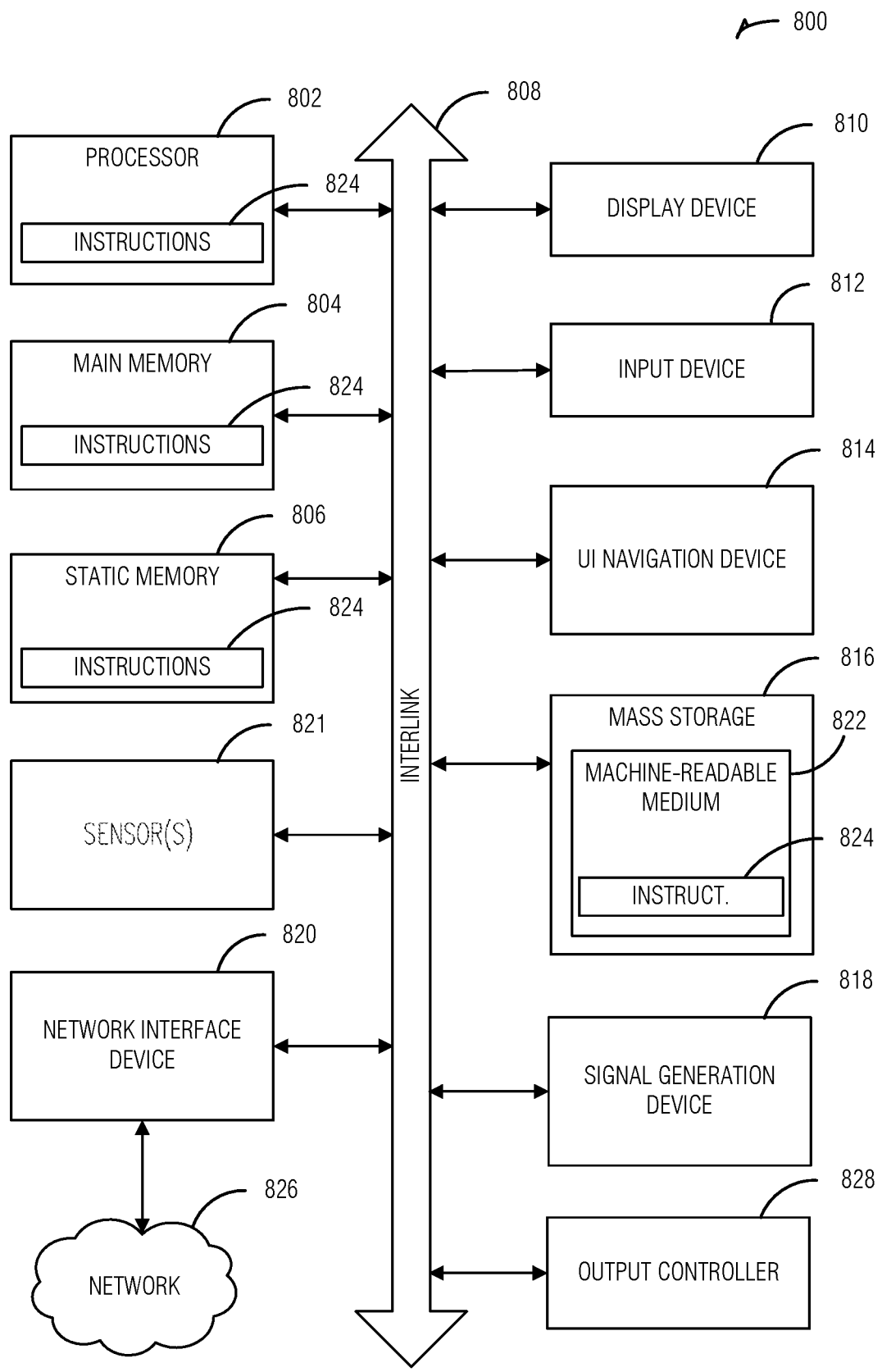
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A power management circuit for interfacing with one or more USB power delivery controllers, the circuit comprising:
    a routing circuit configured to couple an output of the one or more USB power delivery controllers with an input of a basic input/output system (BIOS) of a computer; and
    a control logic circuit configured to receive supply power requests from the one or more USB power delivery controllers, and to modify a feedback path of a dc-dc regulator to provide power, in accordance with the supply power request, to the one or more USB power delivery controllers.

2. The power management circuit of claim 1, wherein the control logic circuit is configured to receive sleep information from the BIOS, the sleep information indicative of scheduled transition of the computer to a sleep mode.

3. The power management circuit of claim 2, wherein the control logic circuit is configured to provide a sleep request to the one or more USB power delivery controllers in response to the sleep information.

4. The power management circuit of claim 3, wherein the routing circuit is configured to route compliance information from the USB power delivery controller to the BIOS.

5. The power management circuit of claim 1, wherein the control logic includes:
    a first output configured to provide the sleep request to a first USB power delivery controller of the one or more USB power delivery controllers; and
    a second output configured to provide a second sleep request to a second USB power delivery controller of the one or more USB power delivery controllers.

6. A method for managing power delivery to a USB power delivery controller of a computer, the method comprising:
    providing a first power level to the USB power delivery controller during a non-sleep mode operation of the computer, including scaling a characteristic of a feedback path of a DC-DC converter, the DC-DC converter having an output coupled to the USB power delivery controller; and
    providing a second power level to the USB power delivery controller when the computer is in a sleep mode, the second power level configured to provide default charge power to a connected device when the computer is in the sleep mode.

7. The method of claim 6, wherein the first power level provides more power than the second power level.

8. The method of claim 6, wherein the providing the second power level includes receiving sleep information from a BIOS of the computer, the sleep information indicative of planned transition of the computer to a sleep mode.

9. The method of claim 8, wherein the providing the second power includes providing a sleep request to the USB power delivery controller in response to the sleep information.

10. The method of claim 9, wherein the providing the second power includes receiving compliance information from the USB power delivery controller at the BIOS, the compliance information indicative of a capability of the USB power delivery controller to provide power at the second power supply level.

11. The method of claim 10, wherein receiving the compliance information includes routing the compliance information from the USB power delivery controller to the BIOS using the power management circuit.

12. A desktop computer system comprising:
    a power supply;
    one or more processors;
    program memory accessible by the one or more processors:
    first and second universal serial bus type-C ports;
    first and second USB power delivery controllers coupled respectively to the first and second USB type-C ports;
    an operating system configured to manage hardware and software resources of the desktop computer system and to provide common services for software programs executed by the one or more processor;
    a basic input output system (BIOS) configured to load the operating system into the program memory and to manage information exchanged between the operating system and one or more connected devices; and
    a power management circuit configured to:
    provide a first power level of a plurality of power levels to the first and second USB power delivery controllers during a non-sleep mode operation of the one or more processors; and
    provide a second power level to the first and second USB power delivery controllers when the processor is in a sleep mode, the second power level configured to default charge power to a device connected to one of the first and second USB type-C ports when the processor is in the sleep mode.

13. The desktop computer system of claim 12, wherein the plurality of power levels includes the second power level.

14. The desktop computer system of claim 12, wherein the first and second USB power delivery controllers are each configured to provide power to a device connected to the respective USB type-C port at a third power level; and
    wherein the power management circuit is configured to prevent the first and second USB power delivery controllers from simultaneously providing power to the respective USB type-C port at the third power level.

15. The desktop computer system of claim 14, including a DC-DC converter coupled to an output of the power supply, the DC-DC converter configured to provide power at the third power level.

16. The desktop computer system of claim 12, wherein the second power level includes a voltage of 5 volts and a maximum current of 900 milliamps (mA).

17. The desktop computer system of claim 16, wherein the plurality of power level can include providing one of a plurality of voltages to the first or second universal serial bus type-C ports; and wherein the plurality of voltages includes 5 volts, 9 volts, 15 volts, and 20 volts.

18. The desktop computer system of claim 12, wherein the power management controller is configured to receive an indication from the BIOS that the one or more processors are entering a sleep mode and to command the first and second USB power delivery controllers to deliver power at the second power level in response to the indication.

19. The desktop computer system of claim 18, wherein the first and second USB power delivery controllers are configured to coordinate delivery of power to a device connected to a respective one of the first and second USB type-C port at the second power level in response to the command.

20. The desktop computer system of claim 19, wherein each of the first and second USB power delivery controllers include an output coupled to an input of the BIOS, the input indicative of the first and second USB power delivery controllers delivering power at the second power level when the input is in a first state.

\* \* \* \* \*

UNITED STATES PATENT AND TRADEMARK OFFICE
CERTIFICATE OF CORRECTION

PATENT NO. : 11,093,020 B2  Page 1 of 1
APPLICATION NO. : 15/819552
DATED : August 17, 2021
INVENTOR(S) : Kadgi et al.

It is certified that error appears in the above-identified patent and that said Letters Patent is hereby corrected as shown below:

In the Claims

In Column 12, Lines 30-31, in Claim 12, delete "processors:" and insert --processors;-- therefor Signed and Sealed this
Fifteenth Day of February, 2022

Drew Hirshfeld
*Performing the Functions and Duties of the
Under Secretary of Commerce for Intellectual Property and
Director of the United States Patent and Trademark Office*